United States Patent
Buburuzan et al.

(10) Patent No.: US 10,752,244 B2
(45) Date of Patent: Aug. 25, 2020

(54) DEVICES, METHOD AND COMPUTER PROGRAM FOR PROVIDING INFORMATION ABOUT AN EXPECTED DRIVING INTENTION

(71) Applicant: VOLKSWAGEN AKTIENGESELLSCHAFT, Wolfsburg (DE)

(72) Inventors: Teodor Buburuzan, Braunschweig (DE); Sandra Kleinau, Rötgesbüttel (DE); Bernd Rech, Bokensdorf (DE); Monique Engel, Braunschweig (DE); Bernd Lehmann, Wolfsburg (DE); Stefan Gläser, Braunschweig (DE); Hendrik-Jörn Günther, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 286 days.

(21) Appl. No.: 15/753,102

(22) PCT Filed: Jul. 28, 2016

(86) PCT No.: PCT/EP2016/068053
§ 371 (c)(1),
(2) Date: Feb. 15, 2018

(87) PCT Pub. No.: WO2017/029096
PCT Pub. Date: Feb. 23, 2017

(65) Prior Publication Data
US 2018/0257645 A1    Sep. 13, 2018

(30) Foreign Application Priority Data
Aug. 20, 2015 (DE) .......... 10 2015 215 929

(51) Int. Cl.
*B60W 30/095* (2012.01)
*B60W 30/08* (2012.01)
(Continued)

(52) U.S. Cl.
CPC ........ *B60W 30/0953* (2013.01); *B60W 30/08* (2013.01); *B60W 30/0956* (2013.01);
(Continued)

(58) Field of Classification Search
CPC ............. B60W 30/0953; B60W 30/08; B60W 30/09567; B60W 40/09; B60W 50/14;
(Continued)

(56) References Cited

U.S. PATENT DOCUMENTS

| 8,810,431 B2 | 8/2014 | Mudalige et al. |
| 2010/0198513 A1* | 8/2010 | Zeng ..................... B60W 40/02 701/300 |

(Continued)

FOREIGN PATENT DOCUMENTS

| CN | 103065500 A | 4/2013 |
| DE | 102008042565 A1 | 4/2010 |

(Continued)

OTHER PUBLICATIONS

Search Report for German Patent Application No. 10 2015 215 929.9; dated May 12, 2016.
(Continued)

*Primary Examiner* — Marthe Y Marc-Coleman
(74) *Attorney, Agent, or Firm* — Barnes & Thornburg LLP (57) ABSTRACT

A device for a vehicle for providing information about an expected driving intention, a device for a vehicle for determining a driving recommendation, a method for a vehicle for providing information about an expected driving intention, a method for a vehicle for determining a driving
(Continued)

recommendation, and a computer program. The device includes a driving analysis module to determine information about an expected trajectory of the vehicle, a control module to determine information about an expected driving intention of the vehicle based on the information about the expected trajectory of the vehicle, and an interface to make available the information about the expected driving intention for one or more vehicle-external entities.

14 Claims, 4 Drawing Sheets

(51) Int. Cl.
*B60W 40/09* (2012.01)
*B60W 50/14* (2020.01)
*G08G 1/16* (2006.01)
*G07C 5/00* (2006.01)
*G08G 1/0962* (2006.01)

(52) U.S. Cl.
CPC ............ *B60W 40/09* (2013.01); *B60W 50/14* (2013.01); *G07C 5/008* (2013.01); *G08G 1/163* (2013.01); *G08G 1/166* (2013.01); *B60W 2520/06* (2013.01); *B60W 2520/10* (2013.01); *B60W 2554/80* (2020.02); *B60W 2555/60* (2020.02); *B60W 2556/65* (2020.02); *G08G 1/09623* (2013.01)

(58) Field of Classification Search
CPC ......... B60W 2520/06; B60W 2520/10; B60W 2550/22; B60W 2550/30; B60W 2550/408; B60W 2720/12; B60W 2720/10; B60W 2550/402; B60W 2520/105; B60W 2510/20; B60W 2540/20; B60W 2750/40; G08G 1/166; G08G 1/163; G08G 1/09623; G07C 5/008; G07C 5/085; G01C 21/36
USPC ........................................................ 701/301
See application file for complete search history.

(56) References Cited

U.S. PATENT DOCUMENTS

| 2013/0099911 A1* | 4/2013 | Mudalige ............... G08G 1/163 |
| | | 340/438 |
| 2013/0179382 A1* | 7/2013 | Fritsch ................... G06N 7/005 |
| | | 706/46 |
| 2016/0362104 A1* | 12/2016 | Miller ................... B60W 30/08 |

FOREIGN PATENT DOCUMENTS

| DE | 102011113019 A1 | 5/2012 |
| DE | 102012218935 A1 | 4/2013 |
| DE | 102013105103 A1 | 11/2014 |
| EP | 2881829 A2 | 6/2015 |
| KR | 1020040050550 A | 6/2004 |
| KR | 1020090030250 A | 3/2009 |
| KR | 1020120061683 A | 6/2012 |

OTHER PUBLICATIONS

Search Report for International Patent Application No. PCT/EP2016/068053, dated Oct. 7, 2016.
Office Action for Chinese Patent Application No. 201680048371.4; dated Nov. 28, 2019.

* cited by examiner

DEVICES, METHOD AND COMPUTER PROGRAM FOR PROVIDING INFORMATION ABOUT AN EXPECTED DRIVING INTENTION

PRIORITY CLAIM

This patent application is a U.S. National Phase of International Patent Application No. PCT/EP2016/068053, filed 28 Jul. 2016, which claims priority to German Patent Application No. 10 2015 215 929.9, filed 20 Aug. 2015, the disclosures of which are incorporated herein by reference in their entireties.

BACKGROUND

The present disclosure relates to devices and methods for vehicles for providing information about an expected driving intention.

SUMMARY

Exemplary embodiments relate to devices and methods for vehicles for providing information about an expected driving intention.

BRIEF DESCRIPTION OF THE DRAWINGS

Disclosed embodiments are described in greater detail below, based on the drawings, but are generally not altogether limited to these exemplary embodiments. The following are shown.

DETAILED DESCRIPTION

Vehicle-to-vehicle (V2V) communication, also known as car-to-car (C2C), and vehicle-to-infrastructure communication, also known as car-to-infrastructure (C2I) or vehicle-to-roadside (V2R), are focal points for automotive research in the 21st century. Communication between vehicles or between vehicles and traffic infrastructure enables a number of new possibilities, for example, coordination of vehicles among themselves, or communication by vehicles with the traffic infrastructure, for example, to provide traffic jam warnings to the vehicles. Vehicles which are equipped for C2C or C2I communication (also collectively referred to as vehicle-to-X (V2X) or car-to-X (car2X) have a transceiver unit to be able to communicate with other vehicles, for example, via direct radio links or mobile radio networks. The communication may be limited to a radius of a few hundred meters, for example, between vehicles or between vehicles and traffic infrastructure. The communication between vehicles via C2C or C2I may be encrypted, and it may be secured via certificates, for example, via long-term certificates (LTCs) or time-limited pseudonym certificates (PCs).

Driving a vehicle in road traffic is dependent on many factors, for example, the road layout, traffic lights, and obstacles, but primarily on other road users who are traveling on the same, often multiple-lane, road. Situations often occur in which it is not possible for a driver to take into account all traffic movements of other vehicles, which do not necessarily have to result in accidents if proper consideration is given to the other road users, but which may often lead to precarious traffic situations, delays, or indeed accidents.

Therefore, the need exists to provide an improved concept to allow vehicles to take one another into consideration, and to improve driving safety of the vehicles involved.

Exemplary embodiments may achieve this, for example, by determining an expected trajectory. A device for a vehicle may be configured according to exemplary embodiments to calculate an expected trajectory, for instance, based on the steering wheel position, acceleration of the vehicle, and/or external sensors, or, for instance, based on travel planning by a driver assistance system or autopilot. This trajectory may, for example, comprise a sequence of time-position points, on the basis of which the device is able to calculate a driving intention of the vehicle. The device may then, for example, transmit this driving intention, which may comprise the expected trajectory, to the other vehicles, for example, via vehicle-to-vehicle communication. These other vehicles may then adjust their own planned trajectories, for example, based on the driving intention, to avoid collisions, or may superimpose warnings or driving assistance to assist the driver while driving.

Exemplary embodiments provide a device for a vehicle. The device comprises a driving analysis module configured for determining information about an expected trajectory of the vehicle. The device furthermore comprises a control module configured for determining information about an expected driving intention of the vehicle, based on the information about the expected trajectory of the vehicle. The device furthermore comprises an interface configured for providing the information about the expected driving intention for one or multiple vehicle-external entities. In exemplary embodiments, the device may enable a dissemination of the driving intention to other vehicles, for instance, to enable them to adjust their own trajectory, based on the expected trajectories, for example, when merging onto an on-ramp. Furthermore, it may be made possible for coordination centers to mitigate critical driving situations in a coordinated manner.

In some exemplary embodiments, the automobile may comprise automatic distance regulation. The vehicle may furthermore comprise an autopilot. The driving analysis module may, for example, be configured to determine the expected trajectory, based on driving planning information of the automatic distance regulation and/or the autopilot.

In some exemplary embodiments, the information about the expected trajectory comprises a time span from 0 to 10 seconds. Dissemination of the information about the expected trajectory for a short time span may increase overall accuracy of the expected trajectory and reduce calculation complexity and transmission complexity.

In some exemplary embodiments, the interface corresponds to an interface for vehicle-to-vehicle communication. Via a vehicle-to-vehicle interface, a low latency may be achieved, or, for example, only communication partners for which the information is relevant, for example, without central management of potential communication partners.

In at least some exemplary embodiments, the vehicle-external entities correspond to additional vehicles. The information about the expected driving intention may make it possible for the additional vehicles to adjust their own trajectory, based on the expected trajectories, for example, when merging onto an on-ramp.

In some exemplary embodiments, the information about the expected trajectory comprises information about a plurality of time-position points. The control module may, for example, be configured to extrapolate the time-position points, to determine the expected driving intention.

Optionally, the driving analysis module may be configured to determine the information about the expected trajectory, based on at least one element from the group including information about a steering angle, information about a position of the vehicle, information about a speed of the vehicle, information about an acceleration of the vehicle, information about a driving direction indicator, information about a distance of other vehicles, information about driving direction indicators of other vehicles, information about a traffic light system, information about an automatic driving control system, and map information. According to some exemplary embodiments, the driving analysis module may use one or a combination of the sources to determine or refine the expected trajectory of the vehicle.

In some exemplary embodiments, the driving analysis module is configured to determine the time components and/or the position components of the plurality of time-position points, based on a variable temporal or spatial distance. A temporal or spatially variable distance of the points may, for example, enable higher accuracy of the information in critical situations, and may make it possible to reduce a transmitted data volume in less critical situations.

In some exemplary embodiments, the driving analysis module is configured to determine the time components and/or the position components of the plurality of time-position points, based on driving dynamics of the vehicle. A temporal or spatial distance of the points based on the driving dynamics may enable higher accuracy of the information in critical driving situations, and may make it possible to reduce a transmitted data volume in less critical situations.

In at least some exemplary embodiments, the time components of the plurality of time-position points may correspond to absolute time points, time points relative to a global reference time system, and/or time points relative to a local reference time system. The use of global or local reference times may enable a temporally more precise use of the points by the vehicle-external entities.

In some exemplary embodiments, the position components of the plurality of time-position points may comprise at least one element from the group including absolute position points, position points relative to a traffic infrastructure, and selection of a geometric component of the traffic infrastructure. The anchoring of the position components in a reference system may enable a geographically more precise use of the points by the vehicle-external entities.

In some exemplary embodiments, the information about the expected driving intention comprises the information about the expected trajectory. If the information about the expected driving intention comprises the information about the expected trajectory, it may be made possible for the vehicle-external entities, for example, to use the trajectories to adjust trajectories of other vehicle users or to avoid collisions.

Exemplary embodiments furthermore provide an additional device for a vehicle. The additional device comprises an interface configured for receiving information about an expected driving intention of at least one vehicle. The additional device furthermore comprises a control module configured for determining a driving recommendation, based on the information about the expected driving intention of the at least one additional vehicle. In exemplary embodiments, the driving recommendation may enable adjusting a trajectory of the vehicle, for example, to avoid hazardous situations, or to design the trip more uniformly and to save energy.

In some exemplary embodiments, the at least one additional vehicle comprises an automatic distance regulation. The at least one additional vehicle may, for example, include an autopilot. The information about the driving intention may, for example, be based on the automatic distance regulation or the autopilot.

In some exemplary embodiments, the vehicle comprises an automatic distance regulation. The vehicle may comprise an autopilot. The control module may, for example, be configured to control the automatic distance regulation or the autopilot, based on the driving recommendation.

In at least some exemplary embodiments, the interface corresponds to an interface for vehicle-to-vehicle communication. Via a vehicle-to-vehicle interface, a low latency may be achieved, or, for example, only driving intention information which is relevant to the vehicle may be received.

In some exemplary embodiments, the control module is configured to control the vehicle, based on the driving recommendation. The control module may, for example, be configured to control the vehicle by longitudinal and/or lateral control, based on the driving recommendation. By controlling the vehicle, the control module may adjust a trajectory of the vehicle, for example, to avoid hazardous situations, or to design the trip more uniformly and to save energy.

In at least some exemplary embodiments, the control module is configured to receive an additional piece of information about an expected driving intention of the vehicle. The control module may be configured to provide warning information about a possible collision for the driving recommendation, based on the information about the expected driving intention of the at least one additional vehicle, and based on the additional information about the expected driving intention of the vehicle. The control module may furthermore be configured to provide steering recommendations to a driver of the vehicle for the driving recommendation, based on the information about the expected driving intention of the at least one additional vehicle, and based on the additional information about the expected driving intention of the vehicle. The warning information and the steering recommendations may, for example, increase driving safety in that it assists the driver.

In some exemplary embodiments, the information about the expected driving intention comprises information about an expected trajectory of the at least one additional vehicle. The information about the expected trajectory may, for example, comprise information about a plurality of time-position points. The control module may be configured to determine the driving recommendation based on the time-position points, for example, to control the vehicle based on the trajectory of the additional vehicle.

In some exemplary embodiments, the time components and/or the position components of the plurality of time-position points are based on a variable temporal or spatial distance. A temporal or spatially variable distance of the points may enable higher accuracy of the information in critical situations, and may make it possible to reduce a transmitted data volume in less critical situations.

In some exemplary embodiments, the information about the expected trajectory may be based on at least one element from the group including information about a steering angle, information about a position of the at least one additional vehicle, information about a speed of the at least one additional vehicle, information about an acceleration of the at least one additional vehicle, information about a driving direction indicator, information about a distance from other vehicles, information about driving direction indicators of other vehicles, information about a traffic light system, information about an automatic driving control system, and map information. A use of such information sources may increase accuracy of the information about the expected trajectory.

In some exemplary embodiments, the time components and/or the position components of the plurality of time-position points may be based on driving dynamics of the at least one additional vehicle. A temporal or spatial distance of the points based on driving dynamics could enable higher accuracy of the information in critical driving situations, and may make it possible to reduce a transmitted data volume in less critical situations.

In some exemplary embodiments, the time components of the plurality of time-position points correspond to absolute time points, time points relative to a global reference time system, and/or time points relative to a local reference time system. The use of global or local reference times may enable a temporally more precise use of the points by different vehicles.

In at least some exemplary embodiments, the position components of the plurality of time-position points comprise at least one element from the group including absolute position points, position points relative to a traffic infrastructure, and selection of a geometric component of the traffic infrastructure. The anchoring of the position components in a reference system may enable a geographically more precise use of the points by the vehicle-external entities.

In at least some exemplary embodiments, the information about the expected trajectory comprises a time span from 0 to 10 seconds, for example, 3 seconds, 5 seconds, or 7 seconds. For example, the time span may also be variable, for example, speed-dependent. A limitation of the information about the expected trajectory to a short time span could increase overall accuracy of the expected trajectory, and could reduce calculation complexity and transmission complexity.

Exemplary embodiments furthermore provide a motor vehicle which comprises the device and/or the additional device.

Exemplary embodiments furthermore provide a method for a vehicle. The method comprises determining information about an expected trajectory of the vehicle. The method furthermore comprises determining information about an expected driving intention of the vehicle, based on the information about the expected trajectory of the vehicle. The method furthermore comprises providing information about the expected driving intention for one or multiple vehicle-external entities.

Exemplary embodiments furthermore provide an additional method for a vehicle. The additional method comprises receiving information about an expected driving intention of at least one additional vehicle. The additional method furthermore comprises determining a driving recommendation, based on the information about the expected driving intention of the at least one additional vehicle.

Exemplary embodiments furthermore provide a program including a program code for carrying out at least one of the methods, if the program code is executed on a computer, a processor, a control module, or a programmable hardware component.

Various exemplary embodiments will now be described in greater detail with reference to the attached drawings, in which several exemplary embodiments are depicted. In the figures, the thickness dimensions of lines, layers, and/or regions may be depicted in an exaggerated manner for the sake of clarity.

In the following description of the attached figures, which merely depict several exemplary embodiments, identical reference characters may denote identical or comparable components. Furthermore, summary reference characters may be used for components and objects which appear multiple times in at least one exemplary embodiment or in one drawing, but which are described jointly with respect to one or multiple features. Components or objects which are described having identical or summary reference characters may be designed identically, but also differently as appropriate, with respect to individual features, multiple features, or all features, for example, their dimensions, unless otherwise evident explicitly or implicitly from the description.

Although exemplary embodiments may be modified and altered in different ways, exemplary embodiments are illustrated as examples in the figures and will be described herein in detail. However, it should be made clear that there is no intention to limit exemplary embodiments to the respective disclosed forms; but rather, exemplary embodiments are to cover all functional and/or structural modifications, equivalents, and alternatives which lie within the scope of the present disclosure. Identical reference characters denote identical or similar elements throughout the description of the figures.

It is to be noted that an element which is described as being "connected to" or "linked with" another element may be directly connected to or linked with the other element, or that interjacent elements may be present. On the other hand, if an element is described as being "directly connected to" or "directly linked with" another element, no interjacent elements are present. Other terms which are used to describe the relationship between elements should be interpreted in a similar manner, for example, "between" versus "directly between," "adjacent" versus "directly adjacent," etc.

The terminology which is used herein serves only to describe particular exemplary embodiments and is not intended to limit the exemplary embodiments. As used herein, the singular forms "a," "an," and "the" may also include the plural forms as long as the context does not expressly specify otherwise. Furthermore, it is to be understood that the terms such as "contains," "containing," "has," "comprises," "comprising," and/or "having," when used herein, specify the presence of stated features, integers, operations, elements, and/or components, but do not preclude the presence or addition of one or more other features, integers, operations, elements, components, and/or groups thereof.

Unless otherwise defined, all terms (including technical and scientific terms) used herein have the same meaning as ascribed to them by persons having ordinary skill in the art, in the field to which these exemplary embodiments belong.

It is to be understood that expressions such as those defined in commonly used dictionaries are to be interpreted as having the meaning which is consistent with their meaning in the context of the relevant technology, and are not to be interpreted in an idealized or overly formal sense unless otherwise expressly defined herein.

Future driver assistance systems, for example, a connected automatic distance regulation or connected adaptive cruise control (connected ACC), line start from standstill at a traffic light system (traffic lights), merging assistants, and intersection assistants, could be implemented more simply and better if the intention of other vehicles with respect to their planned trajectories in the near future were known. Vehicles driving automatically to a certain extent could, for example, calculate their trajectory to be traveled in the near future. The projected trajectory to be traveled in the near future is also available in partially automated systems, for example, an ACC. Exemplary embodiments comprise a concept for describing the driving intention in the near future, based on planned trajectories and communication of the intention to the other road users, for example, with the aid of radio communication.

Exemplary embodiments could use these trajectories as the basis for determining the driving intention in the near future. In this case, the expected trajectory could be described with the aid of displacement-time points. For each one of such points, the acceleration and target speed (or other vehicle-specific dynamic parameters) planned for this point could also optionally be included. By communicating the planned (future) displacement-time point trajectories, the other road users could adjust their own planned trajectory. An ACC system could regulate, for example, based on the planned displacement-time points of the leading vehicle, and not based only on the measured distance from the leading vehicle, as is often the case in conventional system.

Figure 1:
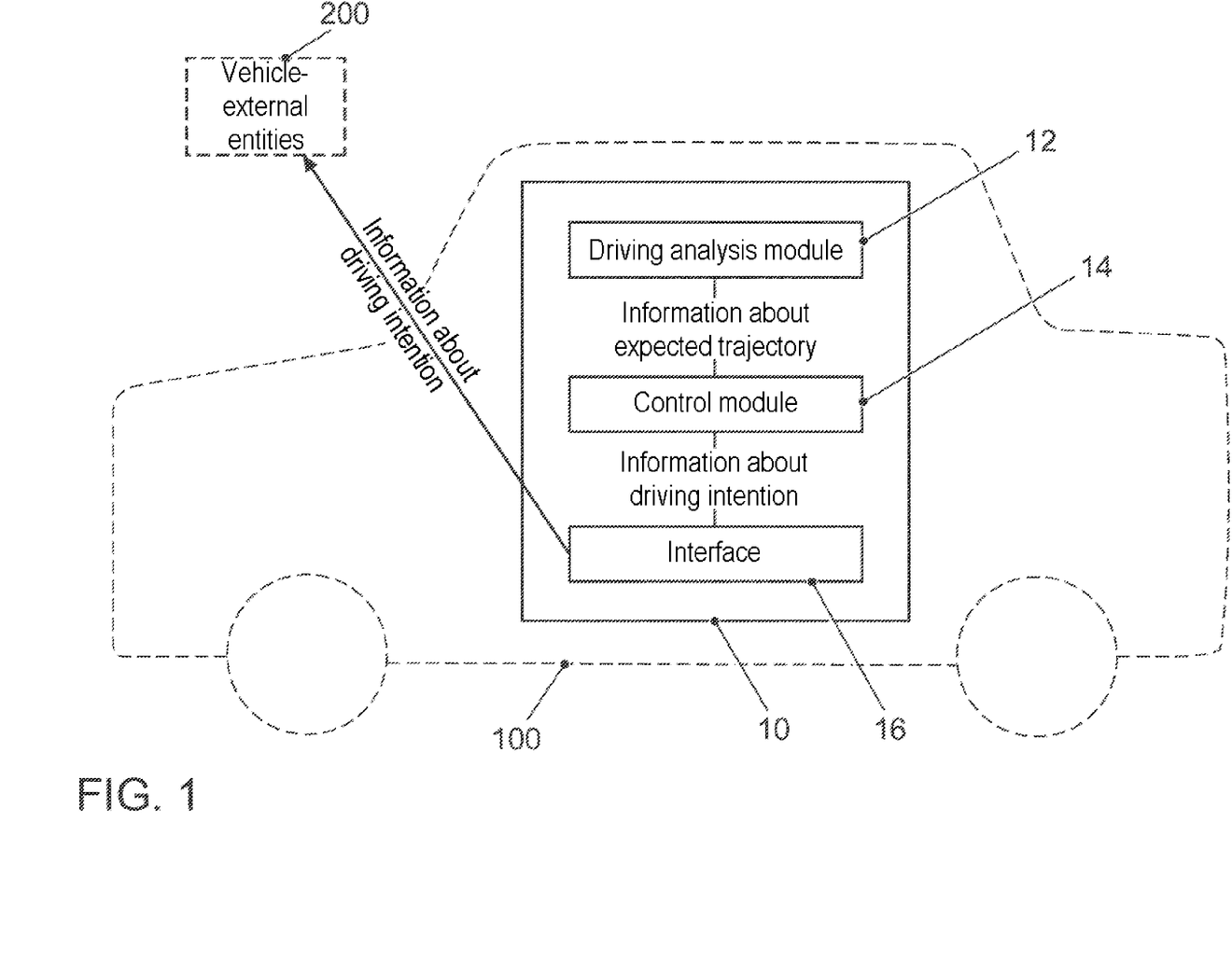
FIG. 1 illustrates a block diagram of an exemplary embodiment of a device for providing information about an expected driving intention.

FIG. 1 illustrates a block diagram of at least one exemplary embodiment of a device 10 for a vehicle 100. The device comprises a driving analysis module 12 configured for determining information about an expected trajectory of the vehicle 100. The device 10 furthermore comprises a control module 14 configured for determining information about an expected driving intention of the vehicle 100, based on the information about the expected trajectory of the vehicle 100. The device 10 furthermore comprises an interface 16 configured for providing the information about the expected driving intention for one or multiple vehicle-external entities 200. The control module 14 is linked to the driving analysis module 12 and the interface 16.

In some exemplary embodiments, the driving analysis module 12 could determine the information about the expected trajectory, for example, based on a system for an automatic distance regulation or based on an autopilot. The vehicle 100 could, for example, comprise the automatic distance regulation or the autopilot. In some exemplary embodiments, the automatic distance regulation and/or the autopilot may also be comprised by the device 10. The driving analysis module 12 could, for example, use a planned trajectory which were calculated by the system for the automatic distance regulation or the autopilot to determine the information about the expected trajectory.

Alternatively or in addition, the driving analysis module 12 could be configured to determine the information about the expected trajectory, based on at least one element from the group including information about a steering angle, information about a position of the vehicle 100, information about a speed of the vehicle 100, information about an acceleration of the vehicle 100, information about a driving direction indicator, information about a distance of other vehicles, information about driving direction indicators of other vehicles, information about a traffic light system, information about an automatic driving control system, and map information. The driving analysis module 12 could, for example, be configured to receive information via an information interface of the vehicle, for example, via a controller area network bus (CAN bus), for instance, to receive the information about the steering angle or the information about the driving direction indicator. The driving analysis module 12 could, for example, determine the information about the expected trajectory based on speed, acceleration, and/or braking data, which it, for example, has received via the CAN bus. The driving analysis module 12 could furthermore, for example, receive data from a sensor module, for example, video data from a camera, for the information about the distance of other vehicles, the information about the driving direction indicator of the other vehicles, and/or the information about the traffic light system; or, for example, distance data from a distance measuring sensor, for the information about the distance of the other vehicles, for example, based on a propagation time method. In some exemplary embodiments, the driving analysis module 12 may furthermore be configured to analyze raw data, for example, video data, to extract the information from the raw data, for example, via pattern recognition, for example, blinking signals of other vehicles or traffic lights from image data. In some exemplary embodiments, the driving analysis module 12 could furthermore be configured to receive the information from vehicle-external sources, for example, switching times from a traffic light system. The automatic driving control system could, for example, correspond to an adaptive distance regulator, an adaptive cruise control, or an autopilot.

The driving analysis module 12 may furthermore be configured to carry out a probability analysis and/or a pattern comparison with a collection of traffic patterns, based on the received or analyzed information, to determine the expected trajectory. For example, the driving analysis module 12 could extrapolate the expected trajectory based on a wheel angle, a speed, and/or an acceleration of the vehicle, for instance, taking into consideration the other road users, based on the distance or video information. In some exemplary embodiments, the driving analysis module 12 could be configured to determine the expected trajectory based on position data or navigation data, for instance, based on an expected turning lane, based on a navigation destination, or based on an expected route based on a selected turning lane at an intersection.

In at least some exemplary embodiments, the information about the expected trajectory comprises information about which route the vehicle is expected to take in the immediate future. The information about the expected trajectory could, for example, comprise information about a plurality of time-position points, wherein a time-position point comprises a time component and a position component. In at least some exemplary embodiments, the information about the expected trajectory could comprise a time span from 0 to 10 seconds, for example, a time span in the next 1, 2, 3, 4, 5, 6, 7, 8, 9, 10, 12, 15, 16, or 20 seconds, following a reference time point; or the driving analysis module 12 could provide time-position points for a period of time for which a confidence interval of the prediction is above a threshold value.

In different driving situations, the information about the expected trajectory could comprise a different granularity of information. The driving analysis module 12 could, for example, be configured to determine the time components and/or the position components of the plurality of time-position points, based on a variable temporal or spatial distance, for example, based on driving dynamics of the vehicle, based on the information about the distance of the other vehicles, or based on the information about the traffic light system.

In some exemplary embodiments, the time-position points could be defined absolutely or relatively. Time components of the plurality of time-position points could, for example, correspond to absolute time points, time points relative to a global reference time system, and/or time points relative to a local reference time system. A global reference time system could, for example, constitute the time information of a global satellite navigation system or the time of a radio time transmission system; a local reference time system could, for example, constitute a synchronized time within a local radio network. The position components of the plurality of time-position points could comprise at least one element from the group including absolute position points, position points relative to a traffic infrastructure, and selection of a geometric component of the traffic infrastructure. Absolute position points could, for example, be based on a satellite navigation system; position points relative to the traffic infrastructure could, for example, specify a position on the street/intersection (meters of road, distance from center/lane). The selection of the geometric component of the traffic infrastructure could, for example, correspond to a lane of the traffic infrastructure. If a traffic infrastructure is broken down into geometric components (tiles) which, for example, subdivide the traffic infrastructure into parts (driving lanes, meters of road, turning lanes into intersections), a selection of these components selected possibly having a variable granularity could enable a reduction of a transmission volume and a simplified analysis.

In the case of starting from a standstill, the departure/starting time point could also be comprised in the information about the expected trajectory. The time point could, for example, be derived from the GNSS (global navigation satellite system) time, or from the switching times of a traffic light system as a relative specification.

Optionally, furthermore, information about the traffic lane could be comprised, for example, the driving lane on which the vehicle, the traffic light system to which the information is related, and/or the vehicle position which is related, with respect to the stop line of the traffic light system which is relevant.

The number of points of the trajectory could be statically determined (for example, a value ascertained in the standard of the message format), or could be determined via an algorithm (for example, up to a maximum number ascertained in the standard of the message format, wherein a minimum number could also be ascertained). In some exemplary embodiments, the number of displacement-time points for describing a trajectory could number at least 10.

The temporal and/or spatial distance of the points of the trajectory could also be statically determined (for example, a value determined in the standard of the message format), or could be determined via an algorithm. In some exemplary embodiments, minimum and maximum distances could be determined, for example, in the standard of the message format, between which the trajectory points may lie. In some exemplary embodiments, the distances do not have to be equidistant. In some exemplary embodiments, the algorithm for distance determination could take into account the planned driving dynamics (the greater the dynamics, the higher the density of the points). The trajectories at a standstill and after departure could also be predicted according to the same algorithm, if the starting point is also defined as the zero point.

Based on the information about the expected trajectory, the control module 14 determines the information about the expected driving intention. The information about the expected driving intention may, for example, comprise the information about the expected trajectory, and/or additional information which extends beyond the expected trajectory, for example, the expected lane selection of the vehicle 100, an expected turning intention, or an expected intention to merge into traffic at a motorway ramp. The control module 14 could, for example, furthermore determine the information about the driving intention, based on the position data, for example, to identify a context for the expected trajectory. For example, the information about the driving intention could furthermore be based on the driving dynamics of the driver of the vehicle, for instance, whether the driver tends to perform risky maneuvers. The control module 14 could, for example, be configured to determine the information about the expected driving intention furthermore based on the driving dynamics of the driver, for example, based on past speed, acceleration, and braking data. In at least some exemplary embodiments, the control module 14 could be configured to determine the information about the driving intention, based on a personality profile of the driver, for example, based on a collection of previous reactions to driving situations. In some exemplary embodiments, the control module 14 is configured to provide the information about the expected driving intention via the interface 16.

The interface 16 could, for example, correspond to an interface for vehicle-to-vehicle communication. The interface 16 could, for example, be configured to provide the information about the expected driving intention to other vehicles in a vicinity around the vehicle 100. The one or multiple vehicle-external entities 200 could, for example, correspond to other vehicles, entities which collect, aggregate, and/or forward the information about the expected driving intentions of multiple vehicles, or analysis entities which statistically analyze the information about the expected driving intentions of multiple vehicles. The one or multiple vehicle-external entities 200 could, for example, correspond to or comprise a vehicle 200a.

The information about the expected driving intention could, for example, include the information about the expected trajectory, for example, according to one of the following definitions. For example, the data packets of the information about the expected trajectory could be based on the standard of the European Telecommunications Standards Institute (ETSI) TS 102 894-2 V1.2.1 (definition of the path trajectory). Such a message data format could, for example, comprise a header, a base data structure, and a data structure for the expected trajectory. The header, for instance, an ITS (intelligent transport system) PDU (physical data unit) header, could, for example, comprise a protocol version, an identification/numbering of the message (message ID), and an identification of the communicating party (station ID). The basic data structure could, for example, comprise a relative time indication at the time of the creation of the message (generation DeltaTime); a type of communicating party (stationType), i.e., for instance, whether it is a vehicle; a position; and an altitude of the communicating party; and optionally, for example, an automation level (automationLevel) of the communicating party. The data structure for the expected trajectory may, for example, be made up of a data structure (for instance, a data field having 24 entries [0 . . . 23], which comprises a changed position (pathDeltaPosition), a changed time (pathDeltaTime), an acceleration in the longitudinal or lateral direction (longitudinalAcceleration and lateralAcceleration), or optionally, a lane, for each entry. The data structure for the expected trajectory may, for example, correspond to, or comprise, the information about the expected trajectory. Some elements, for example, the position, the altitude, or the acceleration, may, for example, also comprise indicators of an accuracy of the information.

Figure 2:
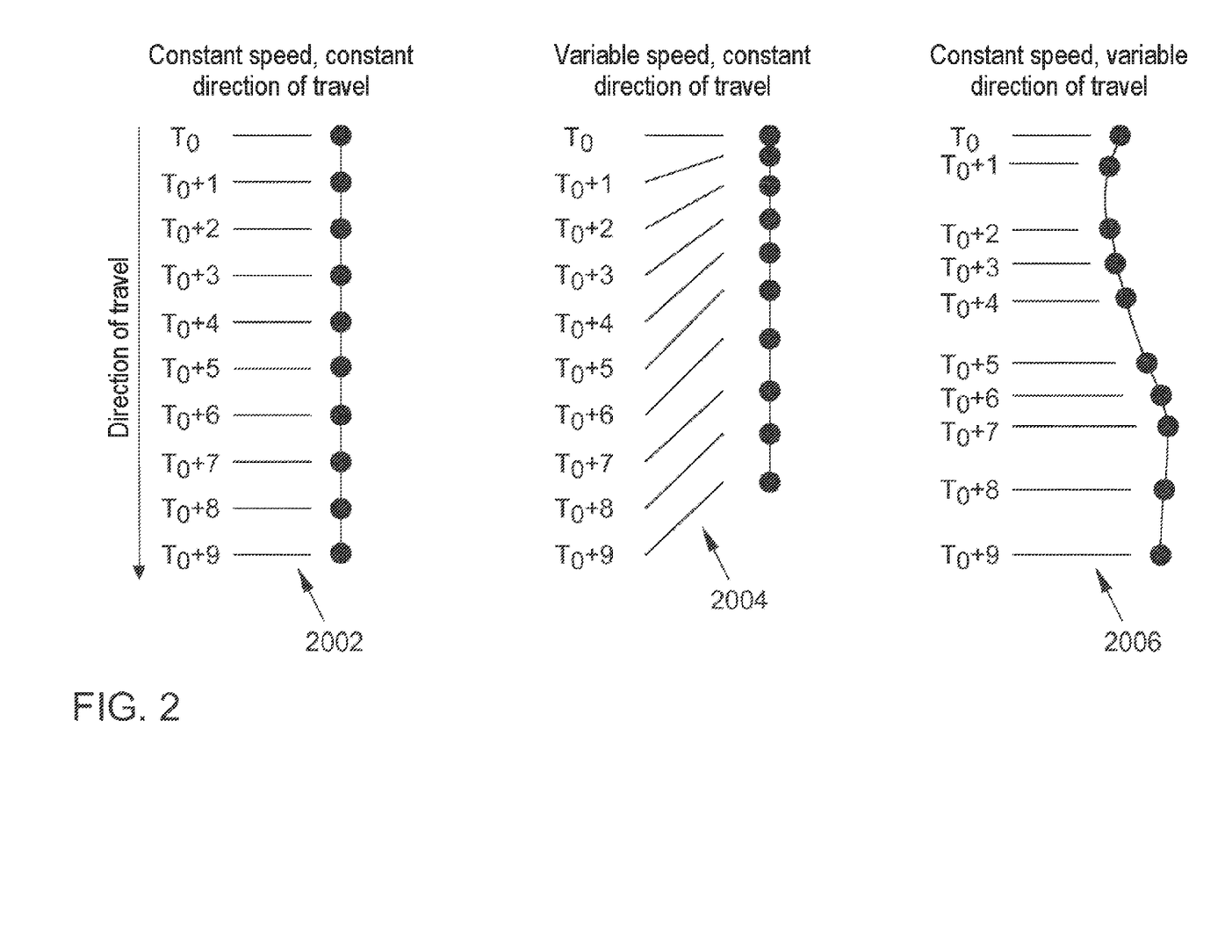
FIG. 2 shows exemplary depictions of information about expected driving intentions.

FIG. 2 shows exemplary depictions of information about expected driving intentions, which comprises information about the future trajectories. 2002 shows an exemplary depiction of information about a driving intention at a constant speed and a constant direction of travel. The time-position points at times T0 . . . T0+9 are both temporally and spatially equidistant. 2004 shows an additional exemplary depiction of information about a driving intention at variable speed and a constant direction of travel. In this case, the (exemplary) time-position points at times T0 . . . T0+9 are temporally equidistant, but are spatially variable. 2006 also shows an additional exemplary depiction of information about a driving intention at constant speed and a variable direction of travel. In this case, the (exemplary) time-position points at times T0 . . . T0+9 are temporally and spatially variable.

In exemplary embodiments, the driving analysis module 12 and/or the control module 14 may correspond to any arbitrary controller or processor or a programmable hardware component. For example, the driving analysis module 12 and/or the control module 14 may also be implemented as software which is programmed for a corresponding hardware component. In this respect, the driving analysis module 12 and/or the control module 14 may be implemented as programmable hardware having correspondingly adapted software. Any arbitrary processors, such as digital signal processors (DSPs), may be used. Exemplary embodiments are not limited to a certain type of processor. Any arbitrary processors, or multiple processors, are conceivable for implementation of the driving analysis module 12 and/or the control module 14.

The interface 16 may, for example, correspond to one or multiple inputs and/or one or multiple outputs for receiving and/or transmitting information, for instance, in digital bit values, based on a code, within a module, between modules, or between modules of different entities.

Figure 3:
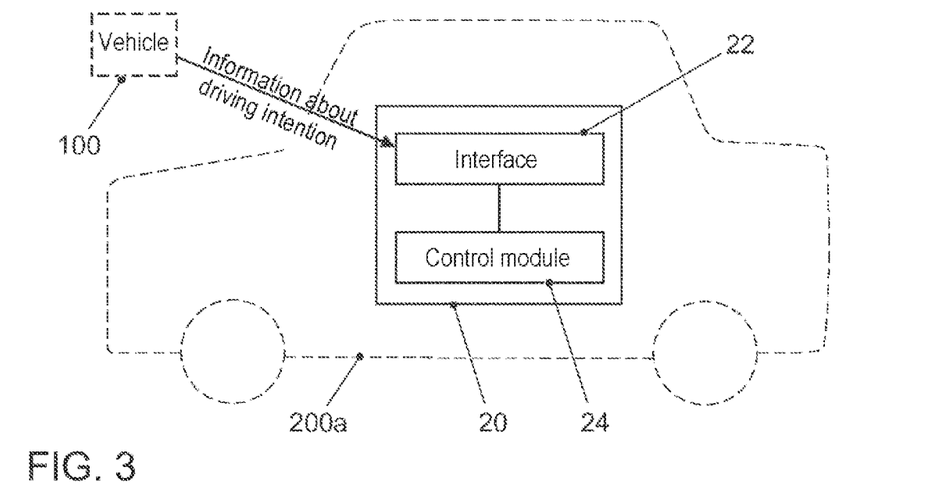
FIG. 3 illustrates a block diagram of an exemplary embodiment of a device for determining a driving recommendation.

In at least some exemplary embodiments, the vehicle 100, as well as a vehicle 200a from FIG. 3, could correspond, for example, to a land vehicle, a water vehicle, an aircraft, a rail vehicle, a street vehicle, an automobile, a terrain vehicle, a motor vehicle, or a truck.

FIG. 3 illustrates a block diagram of at least one exemplary embodiment of a device 20 for a vehicle 200a. The device 20 comprises an interface 22 configured for receiving information about an expected driving intention of at least one additional vehicle 100. The device 20 furthermore comprises a control module 24 configured for determining a driving recommendation, based on the information about the expected driving intention of the at least one additional vehicle 100. The interface 22 is linked to the control module 24.

In at least some exemplary embodiments, the interface 22 could correspond to an interface for vehicle-to-vehicle communication. The interface 22 could, for example, be configured to receive the information about the driving intention directly from the at least one additional vehicle, for example, via vehicle-to-vehicle communication. Alternatively or in addition, the interface 22 could be configured to receive the information about the driving intention from an entity which collects, aggregates, and/or forwards the information about the expected driving intentions from multiple vehicles, for example, aggregated over multiple vehicles, for example, via vehicle-to-infrastructure communication or via a mobile radio network.

In some exemplary embodiments, the control module 24 could be configured to receive an additional piece of information about an expected driving intention of the vehicle 200a. For example, the vehicle 200a could furthermore comprise the device 10. The control module 14 could be configured to provide the additional information about the expected driving intention of the vehicle 200a to the device 20. The additional information about an expected driving intention of the vehicle 200a could, for example, comprise information about an expected trajectory of the vehicle 200a.

For determining the driving recommendation, the control module 24 could, for example, be configured to compare the expected trajectory of the vehicle 200a to the expected driving intention of the at least one additional vehicle 100, and to determine the driving recommendation in such a way that a collision is avoided, or uniform traffic flow is made possible. Alternatively or additionally, the control module could compare the expected driving intention of the at least one additional vehicle 100 to the current position, direction of travel, speed, and/or acceleration of the vehicle 200a, for example, to detect a collision of the vehicle with the expected trajectory of the at least one additional vehicle, for example, via extrapolation of a trajectory of the vehicle 200a and the at least one additional vehicle 100. The control module 24 could furthermore be configured to determine a possible point in time for a passing, merging, or turning maneuver, based on the information about the expected driving intention of the at least one additional vehicle, for example, furthermore based on the position, direction of travel, speed, and/or acceleration of the vehicle 200a.

The control module 24 could, for example, be configured to provide warning information about a possible collision for the driving recommendation, based on the information about the expected driving intention of the at least one additional vehicle 100, and based on the additional information about the expected driving intention of the vehicle 200a. For example, the control module 24 could be configured to display the warning information via a display device, for example, a display device seen by the driver behind the steering wheel or via a head-up display, for example, to inform a driver about a possible risk of collision.

In some exemplary embodiments, the control module 24 could be configured to provide steering recommendations to a driver of the vehicle 200a for the driving recommendation, based on the information about the expected driving intention of the at least one additional vehicle 100, and based on the additional information about the expected driving intention of the vehicle 200a. For example, the control module 24 could be configured to depict a superimposition of the expected trajectories of vehicles in a vicinity of the vehicle 200a with a recommended trajectory for the vehicle 200a. Alternatively or additionally, the control module 24 could be configured to provide lane-change recommendations and/or acceleration or braking recommendations via a head-up display.

In some exemplary embodiments, the vehicle 200a could comprise an automatic distance regulation and/or an autopilot. For example, the device 20 could comprise the automatic distance regulation and/or the autopilot, or the control module 24 could be configured to control or to influence the automatic distance regulation and/or the autopilot. In some exemplary embodiments, the control module 24 could be configured to control the vehicle 200a based on the driving recommendation, for example, by longitudinal and/or lateral control, based on the driving recommendation. In at least some exemplary embodiments, the control module 24 could be configured to control the vehicle only if the driver of the vehicle does not intervene. The control module 24 could, for example, be configured to keep or adjust a distance from preceding automobiles, perform evasive maneuvers, perform a merging maneuver, or perform a passing maneuver, based on the driving recommendation. In some exemplary embodiments, when controlling the distance from other vehicles, systems for longitudinal and lateral control of the vehicles could refer to the displacement-time points of the intention messages which are transmitted by the other vehicles, and not to the measured distance from the leading vehicle, as is customary in normal ACC systems.

Figure 4:
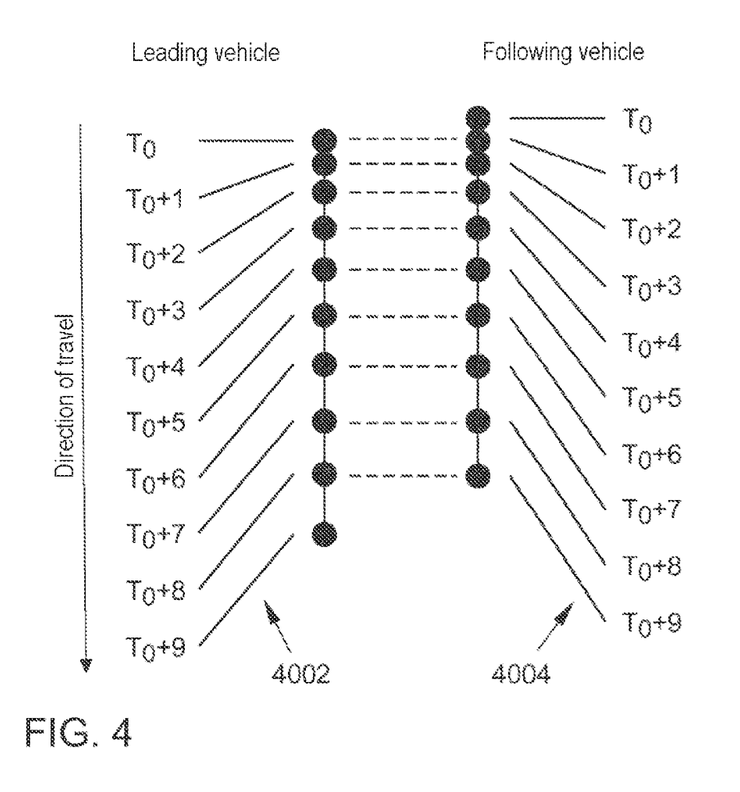
FIG. 4 shows an exemplary depiction of a time-position diagram for an exemplary control of a vehicle.

FIG. 4 shows an exemplary depiction of a time-position diagram for one exemplary control of a vehicle, based on the information about the driving intention of a leading vehicle (convoy). The leading vehicle 4002 is ahead of the following vehicle 4004 in the direction of travel for time-position points T0 . . . T0+9, wherein the spatial distance over time is controlled to a setpoint value, for example, after the start of a convoy. The following vehicle 4004, which, for example, comprises the device 20, refers to the information about the expected driving intention of the leading vehicle 4002, which, for example, comprises the device 10, when calculating its trajectory or control. In this case, the device 20 could be configured to control the following vehicle based on the information about the driving intention, and not based on a measured distance from the vehicle 4004 to the leading vehicle 4002.

In at least some exemplary embodiments, the at least one additional vehicle 100 could comprise an automatic distance regulation and/or an autopilot, and the information about the driving intention could, for example, be based on the automatic distance regulation or the autopilot.

In at least some exemplary embodiments, the information about the expected driving intention may include information about an expected trajectory of the at least one additional vehicle, and wherein the information about the expected trajectory comprises information about a plurality of time-position points. A time-position point could comprise a time component and a position component. The time components and/or the position components of the plurality of time-position points could be based on a variable temporal or spatial distance. The information about the expected trajectory could, for example, be based on at least one element from the group including information about a steering angle, information about a position of the at least one additional vehicle 100, information about a speed of the at least one additional vehicle 100, information about an acceleration of the at least one additional vehicle 100, information about a driving direction indicator, information about a distance of other vehicles, information about driving direction indicators of other vehicles, information about a traffic light system, information about an automatic driving control system, and map information. The time components and/or the position components of the plurality of time-position points could be based on driving dynamics of the at least one additional vehicle 100. The time points of the plurality of time-position points could correspond to absolute time points, time points relative to a global reference time system, and/or time points relative to a local reference time system. The position components of the plurality of time-position points could comprise at least one element from the group including absolute position points, position points relative to a traffic infrastructure, and selection of a geometric component of the traffic infrastructure. The information about the expected trajectory comprise a time span of 0 to 10 seconds.

The at least one interface 22 may, for example, correspond to one or multiple inputs and/or one or multiple outputs for receiving and/or transmitting information, for instance, in digital bit values, based on a code, within a module, between modules, or between modules of different entities.

In exemplary embodiments, the control module 24 may correspond to any arbitrary controller or processor, or to a programmable hardware component. For example, the control module 24 may also implemented as software which is programmed for a corresponding hardware component. In this respect, the control module 24 may be implemented as programmable hardware with correspondingly adapted software. Any arbitrary processors, such as digital signal processors (DSPs), may be used. Exemplary embodiments are not limited to a certain type of processor. Any arbitrary processors, or multiple processors, are conceivable for implementing the control module 24.

More details and properties of the device 20 (for example, information about the expected driving intention, vehicle 100, information about the expected trajectory, device 10, control module 14) are mentioned in connection with the concept or examples which were previously (for example, FIG. 1) described. The device 20 may comprise one or multiple additional optional features which correspond to one or multiple properties of the provided concept or the described examples, as were previously or subsequently described.

Figure 5:
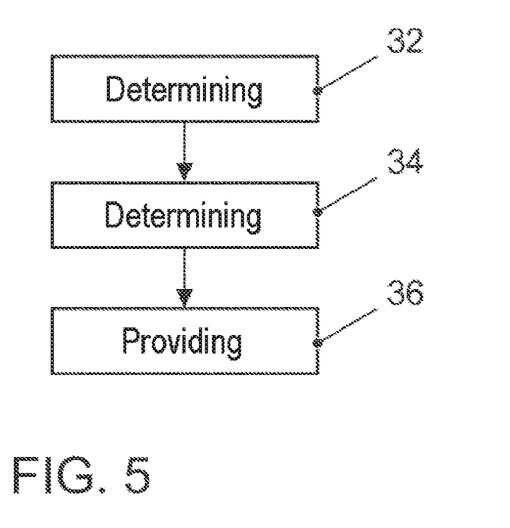
FIG. 5 illustrates a flow chart of an exemplary embodiment of a method for providing information about an expected driving intention.

FIG. 5 illustrates a flow chart of at least one exemplary embodiment of a method for a vehicle. The method comprises determining 32 information about an expected trajectory of the vehicle. The method furthermore comprises determining 34 information about an expected driving intention of the vehicle, based on the information about the expected trajectory of the vehicle. The method furthermore comprises providing 36 information about the expected driving intention for one or multiple vehicle-external entities.

Figure 6:
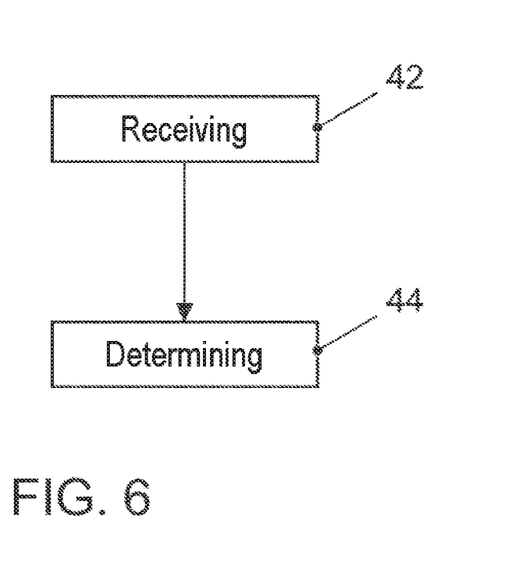
FIG. 6 illustrates a flow chart of an exemplary embodiment of an additional method for determining a driving recommendation.

FIG. 6 illustrates a flow chart of at least one exemplary embodiment of an additional method for a vehicle. The additional method comprises receiving 42 information about an expected driving intention of at least one additional vehicle. The additional method furthermore comprises determining 44 a driving recommendation, based on the information about the expected driving intention of the at least one additional vehicle.

At least one additional exemplary embodiment is a computer program for carrying out at least one of the above-described methods, if the computer program runs on a computer, a processor, or a programmable hardware component. Another additional exemplary embodiment is a digital storage medium which is machine-readable or computer-readable, and which has electronically readable control signals which are able to interact with a programmable hardware component in such a way that one of the above-described methods is carried out.

The features disclosed in the above description, the following claims, and the attached figures may be relevant and may be implemented in their various embodiments both individually as well as in any arbitrary combination for carrying out an exemplary embodiment.

Although some embodiments have been described with respect to a device, it is to be understood that these embodiments also constitute a description of the corresponding method, so that a block or a structural component of a device may also be understood to be a corresponding method operation or a feature of a method operation. Similarly, embodiments which have been described with respect to a method operation or as a method operation also constitute a description of a corresponding block or detail or feature of a corresponding device.

Depending on certain implementation requirements, exemplary embodiments may be implemented in hardware or in software. The implementation may be carried out using a digital storage medium, for example, a floppy disk, a DVD, a Blu-Ray disc, a CD, a ROM, a PROM, an EPROM, an EEPROM, or a FLASH memory, a hard disk, or another magnetic or optical memory, on which electronically readable control signals are stored, which are able to interact, or which interact, with a programmable hardware component in such a way that the respective method is carried out.

A programmable hardware component may be formed via a processor, a central processing unit (CPU), a graphics processing unit (GPU), a computer, a computer system, an application-specific integrated circuit (ASIC), an integrated circuit (IC), a system on chip (SOC), a programmable logic element, or a field-programmable gate array (FPGA) including a microprocessor.

The digital storage medium may therefore be machine-readable or computer-readable. Some exemplary embodiments thus include a data carrier which has electronically readable control signals which are capable of interacting with a programmable computer system or a programmable hardware component in such a way that one of the methods described herein is carried out. At least one exemplary embodiment is thus a data carrier (or a digital storage medium or a computer-readable medium) on which the program is stored for carrying out one of the methods described herein.

Generally, exemplary embodiments may be implemented as a program, firmware, a computer program, or a computer program product including program code, or as data, wherein the program code or the data is/are effective for carrying out one of the methods if the program runs on a processor or a programmable hardware component. The program code or the data may, for example, also be stored on a machine-readable carrier or data carrier. The program code or the data may exist inter alia as source code, machine code, or byte code, as well as other intermediate code.

Furthermore, at least one additional exemplary embodiment is a data stream, a signal sequence, or a sequence of signals, which constitute(s) the program for carrying out one of the methods described herein. The data stream, the signal sequence, or the sequence of signals may, for example, be configured so as to be transferred via a data communication connection, for example, via the Internet or another network. Exemplary embodiments are thus also signal sequences representing data, the sequences being suitable for transmission via a network or a data communication connection, wherein the data constitute the program.

A program according to at least one exemplary embodiment may implement one of the methods during its execution, for example, by reading memory locations or writing a piece of data or multiple pieces of data into them, whereby switching operations or other operations are possibly generated in transistor structures, in amplifier structures, or in other electrical, optical, or magnetic components, or components operating according to another functional principle.

Accordingly, data, values, sensor values, or other information may be recorded, determined, or measured by a program, by reading a memory location. A program may therefore detect, determine, or measure variables, values, measured variables, and other information by reading one or multiple memory locations, and may effect, initiate, or carry out an action by writing into one or multiple storage locations, and may control other devices, machines, and components.

The above-described exemplary embodiments constitute merely an illustration of the principles of the present disclosure. It is to be understood that modifications and variations of the arrangements and details described herein will be clear to others skilled in the art. Therefore, it is intended that the present disclosure is to be limited only by the scope of protection of the patent claims below, not by the specific details which have been presented herein based on the description and the explanation of the exemplary embodiments.

LIST OF REFERENCE CHARACTERS

10 Apparatus
12 Driving analysis module
14 Control module
16 Interface
20 Apparatus
22 Interface
24 Control module
32 Determining
34 Determining
36 Providing
42 Receiving
44 Determining
100 Vehicle
200 One or more vehicle-external entities
200a Vehicle
2002 Driving intention at a constant speed and in a constant direction of travel
2004 Driving intention at a variable speed and in a constant direction of travel
2006 Driving intention at a constant speed and in a variable direction of travel
4002 Leading vehicle
4004 Following vehicle

The invention claimed is:

1. An apparatus for a vehicle, the apparatus comprising:
a driving analysis module for determining information about an expected trajectory of the vehicle;
a control module for determining information about an expected driving intention of the vehicle based on the information about the expected trajectory of the vehicle, wherein the driving analysis module and the control module are implemented in a processor; and
an interface for providing information about the expected driving intention for one or multiple vehicle-external entities, wherein the information about the expected trajectory includes information about a plurality of time-position points, wherein a time-position point includes a time component and a position component,
wherein the driving analysis module determines the time components and/or the position components of the plurality of time-position points based on a variable temporal or spatial distance, and
wherein the information about the expected driving intention includes the information about the expected trajectory.

2. The apparatus of claim 1,
wherein the information about the expected trajectory comprises a time span from 0 to 10 seconds, and/or
wherein the interface corresponds to an interface for vehicle-to-vehicle communication, and/or
wherein the vehicle-external entities correspond to additional vehicles.

3. The apparatus of claim 1,
wherein the driving analysis module determines the information about the expected trajectory based on at least one element from the group including information about a steering angle, information about a position of the vehicle, information about a speed of the vehicle, information about an acceleration of the vehicle, information about a driving direction indicator, information about a distance of other vehicles, information about driving direction indicators of other vehicles, information about a traffic light system, information about an automatic driving control system, and map information.

4. The apparatus of claim 3,
wherein the driving analysis module determines the time components and/or the position components of the plurality of time-position points, based on driving dynamics of the vehicle, and/or
wherein the time components of the plurality of time-position points correspond to absolute time points, time points relative to a global reference time system, and/or time points relative to a local reference time system, and/or
wherein the position components of the plurality of time-position points comprise at least one element from the group including absolute position points, position points relative to a traffic infrastructure, and selection of a geometric component of the traffic infrastructure.

5. A device for a vehicle, the device comprising:
an interface for receiving information about an expected driving intention of at least one additional vehicle, and
a control module for determining a driving recommendation, based on the information about the expected driving intention of the at least one additional vehicle,
wherein the control module is implemented in a processor,
wherein the information about the expected driving intention includes information about an expected trajectory of the at least one additional vehicle,
wherein the information about the expected trajectory includes information about a plurality of time-position points,
wherein a time-position point includes a time component and a position component, and
wherein the time components and/or the position components of the plurality of time-position points are based on a variable temporal or spatial distance.

6. The device of claim 5, wherein the interface is an interface for vehicle-to-vehicle communication.

7. The device of claim 5, wherein the control module controls the vehicle based on the driving recommendation.

8. The device of claim 7, wherein the control module controls the vehicle by longitudinal and/or lateral control, based on the driving recommendation.

9. The device of claim 5, wherein the control module receives an additional piece of information about an expected driving intention of the vehicle, and
wherein the control module provides warning information about a possible collision for the driving recommendation based on the information about the expected driving intention of the at least one additional vehicle and based on the additional information about the expected driving intention of the vehicle, and/or
wherein the control module provides steering recommendations to a driver of the vehicle for the driving recommendation based on the information about the expected driving intention of the at least one additional vehicle and based on the additional information about the expected driving intention of the vehicle.

10. The device of claim 5,
wherein the information about the expected trajectory is based on at least one element from the group including information about a steering angle, information about a position of the at least one other vehicle, information about a speed of the at least one other vehicle, information about an acceleration of the at least one additional vehicle, information about a driving direction indicator, information about a distance of other vehicles, information about driving direction indicators of other vehicles, information about a traffic light system, information about an automatic driving control system, and map information, and/or
wherein the time components and/or the position components of the plurality of time-position points are based on driving dynamics of the at least one additional vehicle, and/or
wherein the time points of the plurality of time-position points correspond to absolute time points, time points relative to a global reference time system, and/or time points relative to a local reference time system, and/or
wherein the position components of the plurality of time-position points comprise at least one element from the group including absolute position points, position points relative to a traffic infrastructure, and selection of a geometric component of the traffic infrastructure, and/or
wherein the information about the expected trajectory comprises a time span from 0 to 10 seconds.

11. A method for a vehicle, the method comprising:
determining information about an expected trajectory of the vehicle;
determining information about an expected driving intention of the vehicle, based on the information about the expected trajectory of the vehicle; and
providing the information about the expected driving intention for one or multiple vehicle-external entities,
wherein the information about the expected trajectory comprises information about a plurality of time-position points,
wherein a time-position point comprises a time component and a position component,
wherein the time components and/or the position components of the plurality of time-position points are based on a variable temporal or spatial distance,
wherein the information about the expected driving intention comprises the information about the expected trajectory, and
wherein the method is configured to be carried out by a controller or a processor.

12. A method for a vehicle, the method comprising:
receiving information about an expected driving intention of at least one additional vehicle; and
determining a driving recommendation based on the information about the expected driving intention of the at least one additional vehicle, wherein the information about the expected driving intention includes information about an expected trajectory of the at least one additional vehicle,
wherein the information about the expected trajectory includes information about a plurality of time-position points,
wherein a time-position point includes a time component and a position component,
wherein the time components and/or the position components of the plurality of time-position points are based on a variable temporal or spatial distance, and
wherein the method is configured to be carried out by a controller or a processor.

13. A program including program code for carrying out a method in response to the program code being executed on a computer, a processor, a control module, or a programmable hardware component, the program code being stored in a non-transitory computer readable storage medium,
wherein the method includes:
determining information about an expected trajectory of a vehicle;
determining information about an expected driving intention of the vehicle, based on the information about the expected trajectory of the vehicle; and
providing the information about the expected driving intention for one or multiple vehicle-external entities
wherein the information about the expected trajectory includes information about a plurality of time-position points,
wherein a time-position point includes a time component and a position component, and
wherein the time components and/or the position components of the plurality of time-position points are based on a variable temporal or spatial distance.

14. A program including program code for carrying out a method in response to the program code being executed on a computer, a processor, a control module, or a programmable hardware component, the program code being stored in a non-transitory computer readable storage medium,
wherein the method includes:
receiving information about an expected driving intention of at least one additional vehicle; and
determining a driving recommendation based on the information about the expected driving intention of the at least one additional vehicle,
wherein the information about the expected driving intention includes information about an expected trajectory of the at least one additional vehicle,
wherein the information about the expected trajectory includes information about a plurality of time-position points,
wherein a time-position point includes a time component and a position component, wherein the time components and/or the position components of the plurality of time-position points are based on a variable temporal or spatial distance.

* * * * *